No. 779,187. Patented January 3, 1905.

UNITED STATES PATENT OFFICE.

RICHARD SCHMIDT, OF HOLZMINDEN, GERMANY.

ALPHA-BETA-METHYLIONONE AND PROCESS OF MAKING SAME.

SPECIFICATION forming part of Letters Patent No. 779,187, dated January 3, 1905.

Application filed September 12, 1903. Serial No. 172,969.

*To all whom it may concern:*

Be it known that I, RICHARD SCHMIDT, doctor of philosophy, chemist, a subject of the Duke of Brunswick, and a resident of Holzminden, in the Duchy of Brunswick, German Empire, have invented a new and useful Process for the Preparation of Alpha-b-Methylionone, of which the following is a specification.

According to the United States Letters Patent No. 583,719 methyl, &c., ionones can be produced by treating citral and the homologues of acetone with an alkaline condensing agent to form new ketones and then converting said ketones by means of acids into ketones isomeric with the ketones first formed.

My invention relates to the splitting up of the fragrant ketone called "methylionone" into four varieties, called "alpha-a-methylionone," "alpha-b-methylionone," "beta-a-methylionone," and "beta-b-methylionone," of the following physical and chemical qualities:

| | Boiling-point. | Specific gravity. | Index of refraction. | Melting-point of the corresponding semicarbazon. |
|---|---|---|---|---|
| Alpha-methylionone-a | 137–140° at 15mm | 0.927 at 20° | 1.5009 (20°) | 134/4°. |
| Alpha-methylionone-b | 135–140° at 15mm | 0.931 at 20° | 1.5003 (20°) | 202°. |
| Beta-methylionone-a | 135–140° at 15mm | 0.935 at 20° | 1.5097 (20°) | 138/9°. |
| Beta-methylionone-b | 135–140° at 15mm | 0.936 at 20° | 1.5073 (20°) | 175б°. |

These four methylionones have a more or less pronounced odor, resembling that of ionone. The proportion of these methylionones varies according to the nature of the acid employed in the conversion and its concentration. In using phosphoric acid the products obtained are chiefly the alpha-a and the alpha-b modification. When using concentrated sulfuric acid, the products obtained consist principally of the beta-a and beta-b varieties. Of these four methylionones the easiest to be obtained and the principal product is the alpha-b-methylionone.

According to my invention the alpha-a-methylionone and the alpha-b-methylionone may be obtained by the following process: One part of pseudomethylionone, which is formed by the action of condensing agents on citral in the presence of methylethylketone, is added gradually to four parts of phosphoric acid of specific gravity 1.73. The reaction being rather violent, the temperature of the mixture, which is kept constantly agitated, rises quickly to 65° to 70°. As soon as the temperature begins to fall the product is poured into five times the amount of cold water. The oily layer floating on top is separated and purified by distilling with steam. The product is boiled for about twenty hours with four parts of a faintly-acid solution of sodium-bisulfite solution. The alpha-a-methylionone is readily dissolved by this agent. It can be obtained by adding a solution of caustic soda to the latter, whereby it is decomposed and yields the alpha-a-methylionone as an oil, which, purified by distilling with steam and distillation *in vacuo*, shows the qualities as above described. The alpha-b-methylionone is left floating upon the sodium-bisulfite solution as an insoluble oil, which is purified by suitable methods, as distilling with steam and distillation *in vacuo*. It boils at 135° to 140° at fifteen-millimeter pressure, specific gravity 0.931 at 20° centigrade, index of refraction 1.5003, 20° centigrade, the semicarbazon compound melting at 202° centigrade, the para-brom-phenylhydrazone at 124° to 125° centigrade. In an analogous manner a mixture of beta-a and beta-b methylionone is formed by treating the pseudomethylionone with concentrated sulfuric acid at a temperature of about 0° centigrade. By boiling the product of the conversion with a sodium-bisulfite solution the beta-a modification is dissolved, while the beta-b-methylionone is not attacked. A separation of the beta-a and beta-b methylionone can therefore be effected in the same manner as that of the alpha-a and alpha-b modification, as described above.

What I claim, and desire to secure by Letters Patent of the United States, is—

1. The herein-described process of manufacturing so-called alpha-beta-methylionone which process consists in heating methylionone with bisulfite solution, separating the oil which is insoluble in said bisulfite, and purifying said oil.

2. As a new product, alpha-beta-methylionone being a fragrant oil, for use in perfumery and as a scenting agent in food products, the said new product having a boiling-point of 135° to 140° centigrade at twenty-millimeter pressure, and a specific gravity of 0.931 at 20° centigrade and an index of refraction of 1.5003 at 20° centigrade; its semi-carbazone compound melting at 202° centigrade and its brom-phenylhydrazone at 124° to 125° centigrade.

In witness whereof I have hereunto signed my name in the presence of two subscribing witnesses.

RICHARD SCHMIDT.

Witnesses:
WILLIAM ESSENWEIN,
PETER LIEBER.